May 21, 1968 YOSHIRO HUKAO ETAL 3,383,752

METHOD OF PREPARING STYLUSES FOR REPRODUCING PHONOGRAPH RECORDS

Filed Sept. 17, 1965 8 Sheets-Sheet 1

Yoshiro Hukao
Emiko Higashinakagawa
Kiyohiro Yazawa
Hayashi Tsujii
INVENTOR.

BY George B. Oujevolk
Attorney

METHOD OF PREPARING STYLUSES FOR REPRODUCING PHONOGRAPH RECORDS

Filed Sept. 17, 1965 8 Sheets-Sheet 2

INVENTOR.

BY

Yoshiro Hukao
Emiko Higashinakagawa
Hayoshi Tsuji
Kiyohiro Yazawa
INVENTOR.

BY George B. Oujevolk
Attorney

Yoshiro Hukao
Emiko Higashinakagawa
Hayashi Tsuji
Kiyoharu Yazawa
INVENTOR.

BY George B. Oujevolk
Attorney

Yoshiro Hukao
Eruko Higashinakagawa
Kiyohiro Yozawa
Hiyashi Tsiya INVENTOR.

BY George B. Auyerath
Attorney

Yoshiro Hukao
Emiko Higashinakagawa
Hayashi Tsujii
Kiyoharu Yazawa
INVENTOR.

BY George B. Oujevolk
Attorney

INVENTOR.

BY

Attorney

May 21, 1968 YOSHIRO HUKAO ETAL 3,383,752

METHOD OF PREPARING STYLUSES FOR REPRODUCING PHONOGRAPH RECORDS

Filed Sept. 17, 1965 8 Sheets-Sheet 8

Yoshiro Hukao
Eiichiro Higashi
Hayashi Tsuji
Kiyoharu Yazawa
INVENTOR.

BY George B. Oujevolk
Attorney

United States Patent Office 3,383,752
Patented May 21, 1968

3,383,752

METHOD OF PREPARING STYLUSES FOR REPRODUCING PHONOGRAPH RECORDS

Yoshiro Hukao, Ota-ku, Tokyo, Emiko Higashinakagawa, Yokohama-shi, Hayashi Tsujii, Ota-ku, Tokyo, and Kiyohiro Yazawa, Yokohama-shi, Japan, assignors to Tokyo Shibaura Electric Co. Ltd., Kawasaki-shi, Japan, a corporation of Japan Filed Sept. 17, 1965, Ser. No. 488,215
Claims priority, application Japan, Sept. 18, 1964, 39/53,060; Mar. 16, 1965, 40/14,802; June 29, 1965, 40/38,453; Aug. 20, 1965, 40/50,563, 40/50,565
5 Claims. (Cl. 29—169.5)

ABSTRACT OF THE DISCLOSURE

A method of preparing a stylus for reproducing phonograph records by cutting a corundum ore to form a stylus tip having an axis of crystalline orientation in a region other than the region defined by a spherical quadrilateral with four apices and a region defined by the crystalline symmetry of corundum. The stylus tip thus formed is mounted on a holder in a predetermined manner so that the direction of rubbing between the stylus tip and the record will be in desired regions.

This invention relates to a method of preparing styluses for reproducing phonograph records.

Heretofore, sound reproducing styluses have been prepared by cutting a corundum crystal, such as sapphire or ruby, into a rod shaped member regardless of its crystalline orientation. As a result it has been found that some styluses wear out in relatively short time whereas the others can be used for a greater length of time. It has also been found that both sides of the stylus tip which engage the side surfaces of the sound track or groove, do not wear uniformly thus resulting in unbalanced reproduced sounds of stereoplayers.

It is an object of this invention to provide an improved method of preparing a stylus for reproducing sound having a predetermined crystalline orientation.

A further object of this invention is to provide an improved method of preparing a stylus for reproducing sound which is resistant to wear.

A still further object of this invention is to provide a method of preparing a stylus having a predictable long life.

Another object of this invention is to provide a method of preparing a stylus for reproducing phonograph records wherein the spherical surface of the stylus tip wears uniformly so that improved fidelity is maintained over a length of operating time.

Yet another object of this invention is to provide a method of preparing a stylus especially suitable for stereo records which can reproduce sound of high fidelity without distortion.

A further object of this invention is to provide a method of preparing a stylus for reproducing sounds without damage or impairment to the original true sound.

Another object of this invention is to simplify the mounting operation of the stylus tip on a stylus holder while maintaining the crystal orientation of the stylus in the chosen condition.

For a better understanding of this invention, reference may be made to the following description taken in connection with the accompanying drawings, in which.

Figure 1:
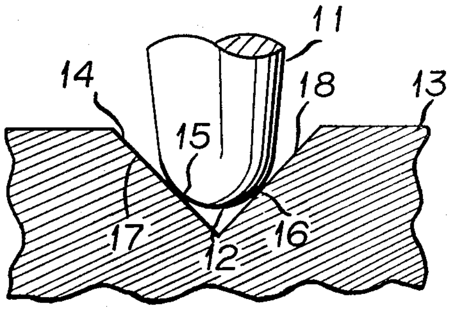
FIG. 1 is a side elevation, partly in section, of a record reproducing stylus prepared by a conventional method and engaging a sound track of a phonograph record.

Referring now to FIG. 1 showing the record reproducing stylus prepared by the prior art method the tip 12 of a record reproducing stylus 11 made from a crystal of corundum, for example, sapphire, ruby or the like is finished to have a spherical configuration to cooperate with V-shaped sound tracks or grooves 12 of a phonograph record 13. As a result the stylus 11 makes contact with the side walls 17 and 18 of the sound track 14 at two contacting points 15 and 16. When the weights of a cartridge supporting the stylus and of a pick-up arm (not shown) which supports the cartridge are applied to the stylus which is in contact with the sound track 14 in the manner described above and the phonograph record 13 is rotated at a constant speed the bending of the sound track is sensed as mechanical motions which are transmitted to an electro-mechanical translating mechanism (not shown) to convert said mechanical motions into electrical signals while the stylus 11 is maintained in contact with the track 14.

Figure 2:
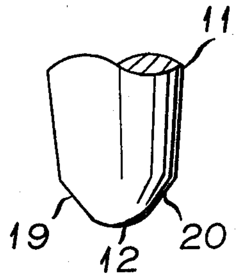
FIG. 2 is a side elevation showing the manner of wear of a record reproducing stylus prepared by the conventional method.

As is well known in the art the record reproducing stylus is preferably to be made of a wearing resistant material, and sapphire and the like which are relatively readily available are predominately utilized for this purpose. Crystals of sapphire are most suitable for preparing record reproducing styluses because it can be synthesized at relatively a low cost and because it is one of the hardest known substances and has a wearing resistance. However when used over an extended period of time even a stylus made of sapphire becomes worn to have a deformed configuration as shown in FIG. 2. Thus, the points of contacts 15 and 16 between the tip 12 and the side wall 17 and 18 of the track or groove 14 are worn to form flat surfaces 19 and 20.

From the standpoint of reproducing sounds, state of contact as shown in FIG. 1 is ideal and phonograph records and pick-ups are designed to realize such a contact state between the stylus 11 and the sound track 14.

When the stylus is worn away to have a configuration shown in FIG. 2, the fidelity of reproducing sounds is impaired and in an extreme case may cause damage of the sound track 14. Thus, there is a certain limit for the wear of sound reproducing styluses and those which have worn to such an extent must be discarded.

According to the conventional method of manufacturing a sound reproducing stylus, a rod shaped member is cut out from a corundum or sapphire ore and the tip of the rod shaped member is ground to have a spherical shape. Styluses manufactured in this manner do not have uniform quality or resistance to wear, viz. one has a long life, while the other wears out and doing so, damages the sound tracks of records and impairs the quality of reproduced sounds in relatively short time.

Further, while it is desirable that the contact points on both sides of a stylus wear equally, one contact point often wears more quickly than the other, thus causing an unbalance between left and right when reproducing stereo-records.

In this manner, the quality or life of stylus manufactured by prior art methods varies greatly and it has been impossible to determine the life of the stylus when it is manufactured.

Customers who have purchased styluses of short life will suffer sounds of poor quality as well as damage to records. On the other hand makers of styluses are obliged to sell their products with a short life guarantee, notwithstanding the fact that there are many styluses of longer life.

As a result of an investigation it has been found that sapphire has large crystalline anisotropy against wear so that the amount of wear differs as much as several hundred times for different crystalline orientations, and that the amount of wear is dependent upon the inclination of the wearing surface with respect to the crystal axis and the direction of rubbing motion with respect to the crystal axis. Thus, the difference in the useful life of various prior styluses is believed to have been caused by the anisotropy of sapphire crystals and not be unevenness of the raw material. In other words, styli having contact surfaces on their spherical tips which are oriented with respect to crystal axis to be less resistant to wear exhibit shorter life whereas those having contact surfaces which are highly resistant to wear have longer life. Thus, it is clear that it will always be possible to manufacture styluses of long life by properly controlling the orientation of the wearing surface with respect to the crystal axis.

Desirable relation between the wearing surface or the direction of rubbing motion and the crystal axis of sapphire can be readily determined by observing interference figures of X-ray diffraction or polarization microscope so that this method is very useful for mass production.

The anisotropy of wear of the sound reproducing stylus is caused not only by the axial direction of the stylus but also by the direction of rubbing thereof. Accordingly, by three coordinates, viz. the orientation of the axis of the stylus ($\theta$, $\varphi$) and the direction of rubbing ($\omega$), are necessitated to express the quantity of wear.

Figure 3:
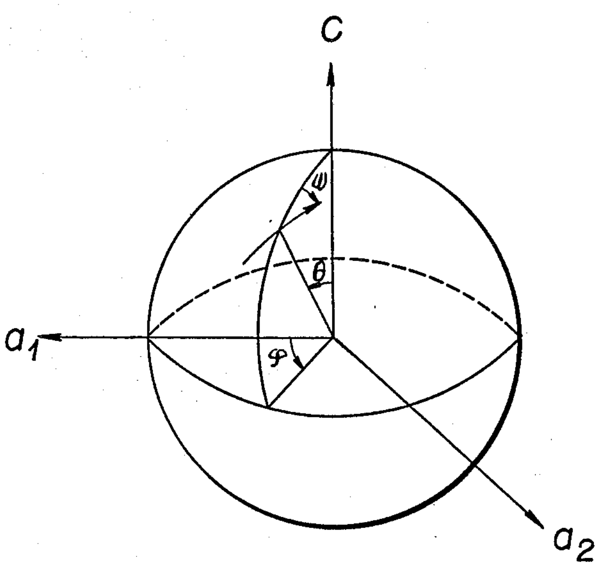
FIG. 3 is a spherical projection showing crystalline orientations of a record reproducing stylus prepared according to the method of this invention.

More particularly, as shown by a spherical projection shown in FIG. 3, when the projection is drawn by utilizing the major axis C of the sapphire crystal as the polar axis the coordinates of the axis of the stylus is expressed by the latitude angle $\theta$ measured from the pole and by the longitude angle $\varphi$ measured from one horizontal axis $a_1$ the longitude angle $\varphi$ is measured from the $a_1$ axis toward the $a_2$ axis when it is assumed that the condition of a rhombohedron is represented by $h-k+1=3n$, and the direction of rubbing of the stylus is expressed by azimuth ($\omega$) of the projection of the axis of the stylus on the sphere (the azimuth $\omega$ is measured in the clockwise direction from a point of $\omega=0$ which is in the direction pointing to the projection of the axis of the stylus). It will thus be apparent that any one of different orientations of the crystal of the stylus can be determined by the combination of the latitude angle $\theta$, longitude angle $\rho$ and the azimuth $\omega$.

We have succeeded in predetermining the amount of wear of a sapphire stylus of any crystalline orientation by mathematically arranging the results of wear tests and have found a particular combination of the latitude angle $\theta$, longitude angle $\varphi$ and azimuth $\omega$ necessary to minimize the amount of wear or a particular crystalline orientation in which the amount of wear at the two wearing or rubbing surfaces of a stylus is minimum.

Figure 4:
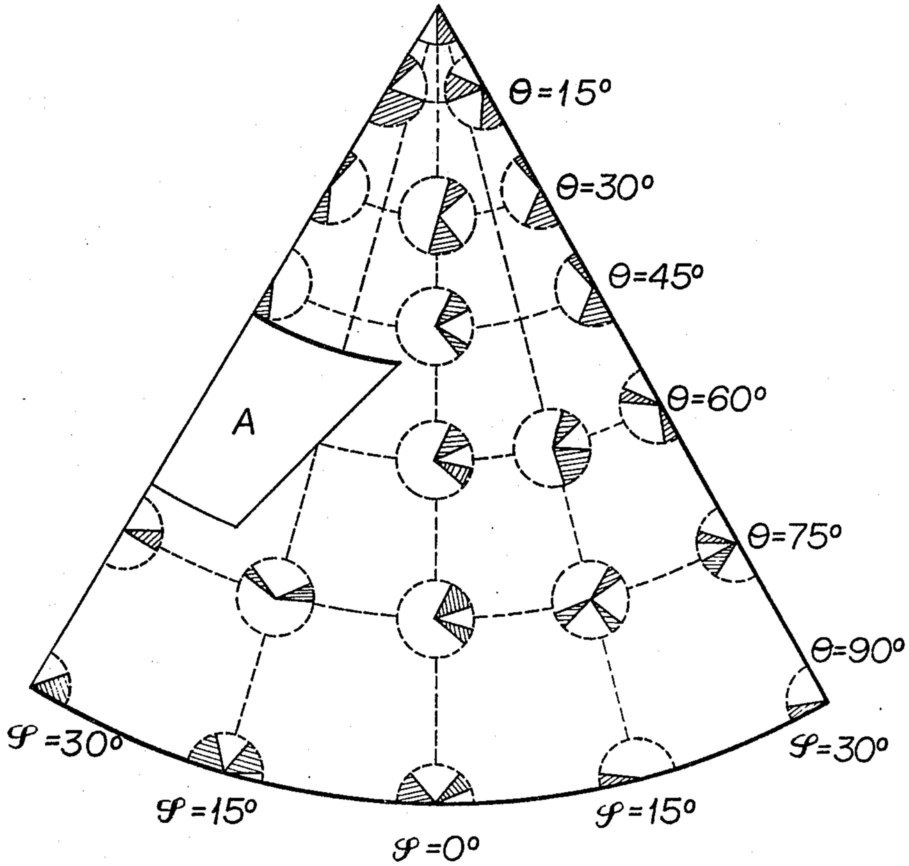
FIG. 4 is a diagram showing a number of selected coordinate points representing regions useful to this invention.

These results are illustrated by a stereoprojection shown in FIG. 4. In this figure coordinates ($\varphi$, $\theta$) of the axis of stylus at different angles (different from each other by 15°) are shown and the regions of less wear at various points with respect to the azimuth are indicated by shaded areas.

The numerical ranges of the azimuth for combinations of $\varphi$ and $\theta$ for these different points are shown in Table 1 below:

TABLE 1.—ORIENTATION OF CRYSTAL AND DIRECTION OF RUBBING

| $\theta$ | $\varphi$ | $\omega$ | | |
|---|---|---|---|---|
| 0° | 0° | 150°–190° | | |
| 15° | 30° | 180°–220° | 270°–320° | |
| | 0° | 10°– 55° | 110°–190° | 240°–290° |
| | −30° | 0°– 20° | 90°–180° | |
| 30° | 30° | 180°–235° | 350°–360° | |
| | 0° | 130°–210° | 25°– 45° | |
| | −30° | 0°– 5° | 150°–180° | |
| 45° | 30° | 180°–235° | 350°–360° | |
| | 0° | 20°– 45° | 135°–190° | |
| | −30° | 170°–180° | | |
| 60° | 30° | 180°–195° | 300°–310° | |
| | 15° | 40°– 60° | 115°–180° | |
| | 0° | 25°– 60° | 120°–135° | |
| 75° | 30° | 240°–270° | 305°–315° | |
| | 15° | 35°– 60° | 95°–120° | 145°–160°, 240°–255° |
| | 0° | 25°– 75° | 100°–125° | |
| | −15° | 60°– 85° | 285°–290° | |
| | −30° | 60°– 90° | | |
| 90° | 30° | 270°–280° | | |
| | 15° | 285°–295° | | |
| | 0° | 40°– 60° | 280°–315° | |
| | −15° | 40°– 80° | 270°–325° | |
| | −30° | 40°– 90° | | |

In the direction of the axis of the stylus in a region A bound in solid lines in FIG. 4, there is no direction of rubbing in which wear is less. Limit values of $\omega$ at intermediate longitude and latitude angles other than those selected directions ($\theta$, $\phi$) of the axis of stylus are given by values interpolated by a continuous function. It is to be understood that all regions which are equivalent to those shown in FIG. 4 by the symmetrical characteristic of sapphire $\bar{3}m-Dzd$ are the regions that can satisfy the object of this invention.

Actually, regions represented by $$\varphi=-30°,\ \theta=12.7°,\ \omega=270°$$

and $$\varphi=0°,\ \theta=15.0°,\ \omega=270°$$

are typical orientations in which wear is small and both sides of the stylus wear equally.

Table 1 above shows various ranges of $\varphi$ and $\omega$ where the latitude angle $\theta$ is varied by 15°. However, by dividing the angle $\theta$ more minutely it has been found that there are preferable orientations other than those in the regions illustrated in Table 1. These are shown in Table 2.

TABLE 2

| $\theta°$ | $\varphi°$ | $\omega°$ |
|---|---|---|
| 7.5–22.5 | −7.5– 7.5 | 240–360, 0–30 |
| 22.5–37.5 | −7.5– 7.5 | 210–300 |
| 37.5–52.5 | −7.5– 7.5 | 190–290 |
| 52.5–67.5 | −7.5– 7.5 | 60–120 |
| 52.5–67.5 | 7.5–22.5 | 60–115 |
| 52.5–67.5 | 22.5–30 | 60–165, 195–300 |
| 67.5–82.5 | −7.5– 7.5 | 75–100 |
| 67.5–82.5 | 22.5–30 | 270–305 |
| 82.5–90 | −30–22.5 | 0– 40, 290–360 |
| 82.5–90 | −22.5– 7.5 | 330–360, 0–35, 150–240 |
| 82.5–90 | 7.5–22.5 | 330–360, 0–60, 150–215 |
| 82.5–90 | 22.5–30 | 140–220 |

Figure 5:
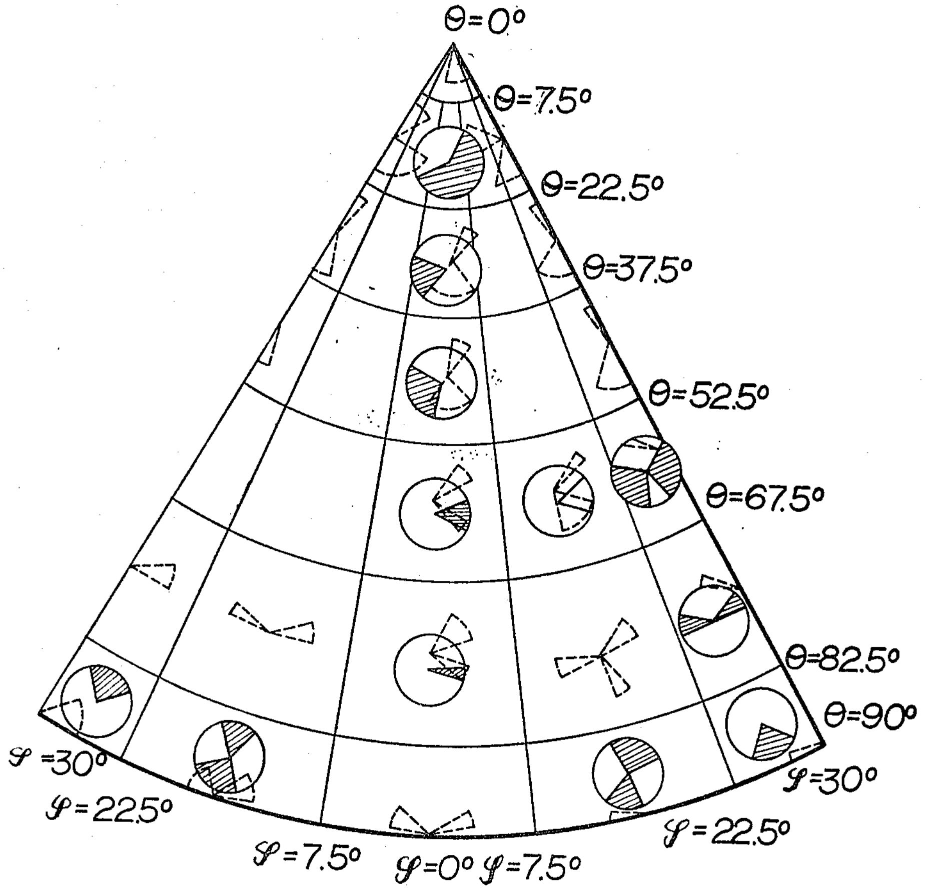
FIG. 5 is a similar view to that of FIG. 3 to illustrate a different region.

Crystal orientations in these regions are shown by the stereo projection shown in FIG. 5.

Similar to FIG. 4, FIG. 5 shows suitably selected coordinates ($\varphi$, $\theta$) of the stylus axis with respect to the azimuth $\omega$ and regions of small wear at the respective selected points are shown by shaded lines.

Referring now to FIGS. 6 to 20 inclusive examples of preferred methods of mounting the stylus tip made of corundum having the characteristic included in the above mentioned regions on the stylus holder will now be described.

Figure 6:
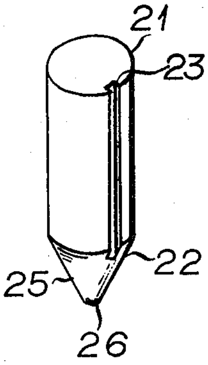
FIG. 6 is a perspective view as an example of a tip of the record reproducing stylus prepared by the method of this invention.
Figure 7:
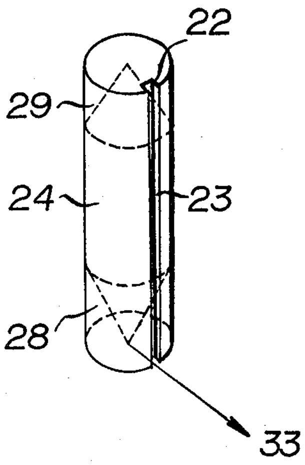
FIG. 7 is a perspective view of a rod shaped member of a raw material utilized for manufacturing the stylus tip shown in FIG. 6.

The stylus tip shown in FIG. 6 is prepared by cutting an axial groove 22, which serves as an indicating portion 23, in one side of a circular rod shaped member 24 as shown in FIG. 7, then grinding one end of the member 24 into a conical shape 26 and finally finishing the tip 26 of the cone into a spherical surface. The indicating portion 23 serves to indicate a direction which is perpendicular to the direction of rubbing in which the wear of the corundum crystal in the form of a rod shaped member 24 is the minimum.

Figure 8:
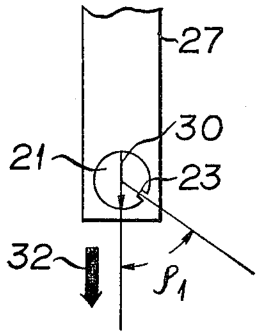
FIG. 8 is a plan view showing a manner of mounting the stylus tip shown in FIG. 6 on a stylus holder.
Figure 9:
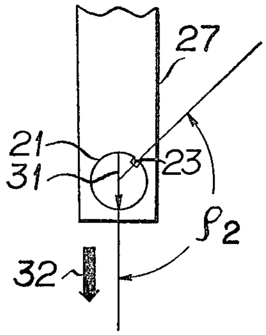
FIG. 9 is a plan view showing a different manner of mounting the stylus tip presented in this invention.

The stylus tip 21 formed with such an indicating portion 23 is mounted on a stylus holder 27 as shown in FIGS. 8 and 9 with the indicating portion 23 utilized as a reference, the stylus holder 27 being connected to an electromechanical converter of a cartridge (not shown). It is to be understood that the stylus tip 21 is mounted on the holder 27 such that the stylus will assume the orientation which is normal to the direction of rubbing of the stylus with respect to the actual phonograph record. In the case shown in FIG. 8, the stylus is such that the lower end 28 of the rod shaped member shown in FIG. 7 is utilized as the stylus tip whereas in the case shown in FIG. 9 the upper end 29 (shown in FIG. 7) of the rod shaped member 24 is utilized as the tip.

Since the corundum crystal has a reversed symmetry the orientation 31 where the stylus tip 21 is cut out of the lower portion 28 of the rod shaped member 24 as shown in FIG. 8 and the orientation 30 where the stylus tip is cut out of the upper portion 29 of the rod shaped member 24 are the same. As a result if it is assumed that the direction 30 is the desirable direction of rubbing when a stylus having a tip cut from the lower end 28 of the rod shaped member 24 shown in FIG. 7 is mounted on the holder 27 then the opposite direction 31 should be the direction of the rubbing where the tip is formed by the upper end 29 of the rod shaped member 24. And the angle of mounting to the holder 27 should be $\rho_1$ and $\rho_2=180°-\rho_1$, respectively, it being understood that these mounting angles are to be measured in a definite direction, counterclockwise, for example, starting from the direction of rubbing 32 shown in FIGS. 8 and 9.

In this manner, when preparing the rod shaped member 24 from the raw material by providing the indicating portion 23 at a position which indicates the direction normal to both directions of rubbing 30 and 31 between the stylus tip and the sound track of the phonograph record it is possible to assure the same angle of mounting to the stylus holder 27 irrespective to which one of the two ends of the rod shaped member 24 is utilized as the stylus tip so that identification of the upper and lower ends of the rod shaped member 24 is not necessary. However, it is essential to identify the mounting angle $\rho_1$ as to 90° or 270° and this identification depends upon the fact to which the indicating portion 23 is located near the center or near the outer periphery of the phonograph record.

Figure 10:
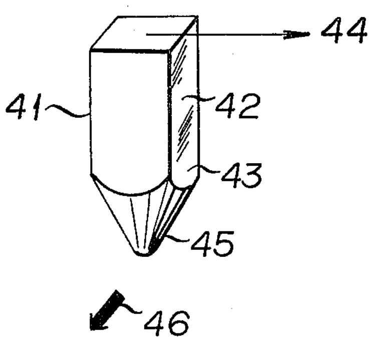
FIG. 10 is a perspective view of a modified record reproducing stylus prepared by the method of this invention.
Figure 11:
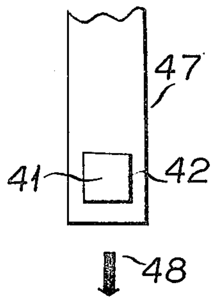
FIG. 11 is a plan view showing a manner of mounting the stylus tip shown in FIG. 10 on a stylus holder.

FIG. 10 illustrates another example of a stylus tip manufactured in accordance with this invention. Different from the circular rod shaped member shown in FIG. 6, the stylus tip 41 shown in FIG. 10 is in the form of a square rod with a particular one side surface mirror finished to provide an indicating portion 42. In this embodiment the orientation to be detected or the direction corresponding to the line 33 in FIG. 7 is a normal 44 of the finished surface 43. Such a stylus 41 may be prepared by making said normal 44 perpendicular to the direction of the sound track 46 of the phonograph record which the tip 45 of the stylus is caused to engage. Thus it will be clear that the stylus tip 41 shown in FIG. 10 should be mounted on a stylus holder 49 such that the indicating portion 42 is held in parallel with the direction of the sound track 48 of a record as shown in FIG. 11.

One example of the method of cutting the stylus tip 41 out of a corundum crystal 49 will now be described with reference to FIG. 12. The corundum ore 49 is monocrystalline and orientations of the crystal axes thereof are the same at any position of the ore.

It is assumed now that, by examining the crystalline axis of the raw material, the direction of the axis of the stylus which satisfies the condition of a long life was found to be represented by an arrow 50 and that, when the tip of the ore is utilized as the tip of the stylus, the direction of rubbing of the stylus was found to be represented by an arrow 51. In such a case the raw material 49 is cut by a cutting blade of a cutting machine, not shown, positioned in a plane containing arrows 50 and 51. Then the position of the cutter is moved while the plane thereof is maintained parallel to divide the ore 49 into a plurality of pieces as shown by dotted lines in FIG. 12 and then one surface (front or back surface) of each piece is mirror finished. Thereafter each piece is cut along lines parallel to the arrow 50 to form a plurality of blanks for preparing the stylus tips 45, shown in FIG. 10.

Each of the blanks are finished to the desired dimensions, then cut to have the desired length, ground at its one end to be formed into conical shape and finally the tip is ground to provide the desired spherical configuration of a given radius of curvature, thus finishing the stylus tip 41 of the square rod shaped as shown in FIG. 10.

Figure 13:
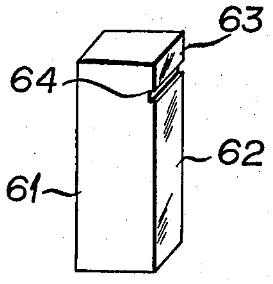
FIG. 13 is a perspective view of a rod shaped member from which a record reproducing stylus tip is prepared by the method of this invention.
Figure 14:
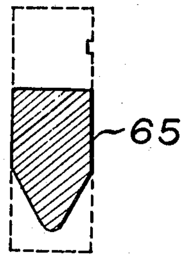
FIG. 14 shows a vertical section of a stylus tip prepared by machining the rod shaped member shown in FIG. 13.
Figure 15:
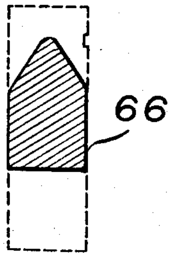
FIG. 15 is a view similar to that shown in FIG. 14 showing another example of the stylus tip of this invention.

FIGS. 13 through 15 illustrate still further modifications of the stylus tips, FIG. 13 shows a square rod shaped member 61 which is cut out of a raw material in the same manner as has been described in connection with FIG. 12 and provided with one mirror finished side surface which is utilized as the first indicating portion 62. Near the upper or lower end 63 of the indicating portion 62 there is a transverse groove which is utilized as the second indicating portion 64. This second indicating portion 64 serves to identify the upper or lower end of the rod shaped member 61 thus indicating that the end having the groove is to be worked to form a stylus. However it will be clear that the second indicating portion 64 may be provided for any one of four side surfaces of the square shaped member 61.

FIGS. 14 and 15 illustrate longitudinal sectional views of styluses 65 and 66 cut out of a rod shaped member shown in FIG. 13. In the case shown in FIG. 14 the end opposite to the second indicating portion 64 is formed into the stylus tip whereas in the case shown in FIG. 15 the end containing the second indicating portion 64 is formed into the stylus tip.

The stylus tip 65 or 66 is mounted on and fixed to a stylus holder in such a manner that the sound track of the phonograph record assumes the desirable crystalline orientation with respect to the direction of rubbing between the stylus and sound track by utilizing the first indicating portion 62 as the reference. As shown by phantom lines in FIGS. 14 and 15 the second indicating portion 64 is removed when the stylus tips 65 and 66 are machined.

Figure 16:
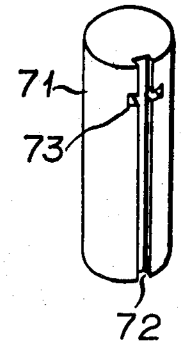
FIG. 16 is a perspective view of still another rod shaped member utilized to prepare a record reproducing stylus tip according to the method of this invention.

FIG. 16 is a perspective view of another example of the rod shaped member for making sound reproducing stylus provided with the first and the second indicating portions. More particularly the first indicating portion 72 is formed as a longitudinal slot cut along the side surface of the rod shaped member 71 and the second indicating portion 73 is provided comprising a slot crossing the first indicating portion. The rod shaped member 71 is machined in the same manner as has been described in connection with FIGS. 14 and 15 to provide a finished stylus. It is to be understood that the second indicating portion 73 is not required to cross the first indicating portion 72 but instead may be provided at any desired position on the side surface.

Figures 12, 17:
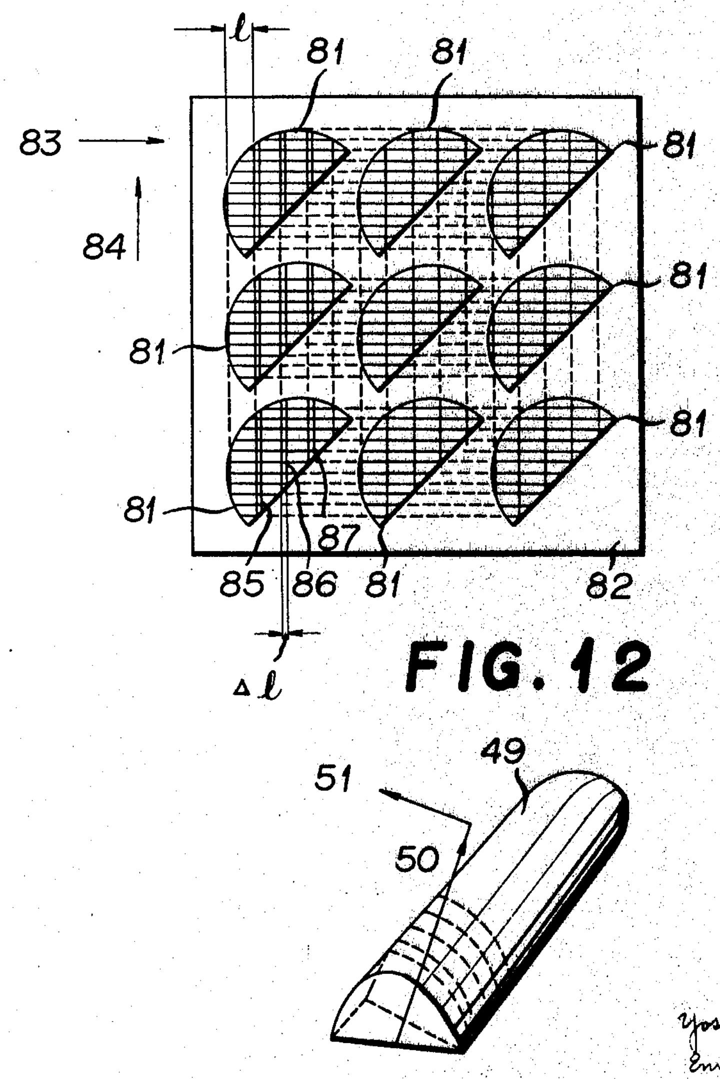
FIG. 12 is a perspective view to explain the step of cutting the stylus tip shown in FIG. 10 from a raw material.
FIG. 17 is a plan view to explain one step of cutting the rod shaped member shown in FIG. 13 from a raw material.

FIG. 17 diagrammatically illustrates one method of cutting a rod shaped member, shown in FIG. 13 or 16, out of a raw material ore. Since the corundum ore is monocrystalline the orientation of its crystalline axis is the same for any position in the same ore. For this reason after cementing raw material ores 81 to a base plate to exhibit the desired crystalline orientation the base plate is mounted on a suitable cutting machine not shown. Then the corundum ores 81 are cut into a plurality of elongated rod shaped members along a plurality of parallel lines in the direction indicated by arrow 83. The resulting elongated rod shaped members are extending along parallel lines in the direction of an arrow 84 which is perpendicular to the arrow 83 thus producing a plurality of square rod shaped members 61 having a given length of $l$, FIG. 13. While the rod shaped members 61 are cut the said first indicating portion 62 is also cut which is utilized as the reference of the azimuth with regard to the rotation about the axis of the stylus. Thereafter the second indicating portion 64 which is utilized as the reference for forming the stylus tip is formed at one end of the rod shaped member, thus finishing the rod shaped member shown in FIG. 13 or 16.

One example of the methods of forming said first and second indicating portions is as follows:

While the raw materials 81 which have been cut along parallel lines indicated by the arrow 83 are still cemented on the base plate 82 these raw materials are simultaneously worked by a cutting machine having a plurality of cutters adapted to form cuts 85, 86, 87 . . . in the direction of the second arrow 84. Thus before or after forming these cuts 85, 86, 87 . . . the base plate 82 is slightly displaced by a distance $\Delta l$ and then by slightly urging the cutters against all rod shaped members the second indicating portions can be formed simultaneously. In this case the longitudinal direction is utilized as the axis of the stylus. Since the thin sheets 81 of the raw material are cut so that the longitudinal direction is oriented to the desired direction with respect to the crystalline axis the end of the holder to which said second indicating portion 64 or 73 is to be secured is automatically determined.

Figures 18, 19, 20, 21, 22:
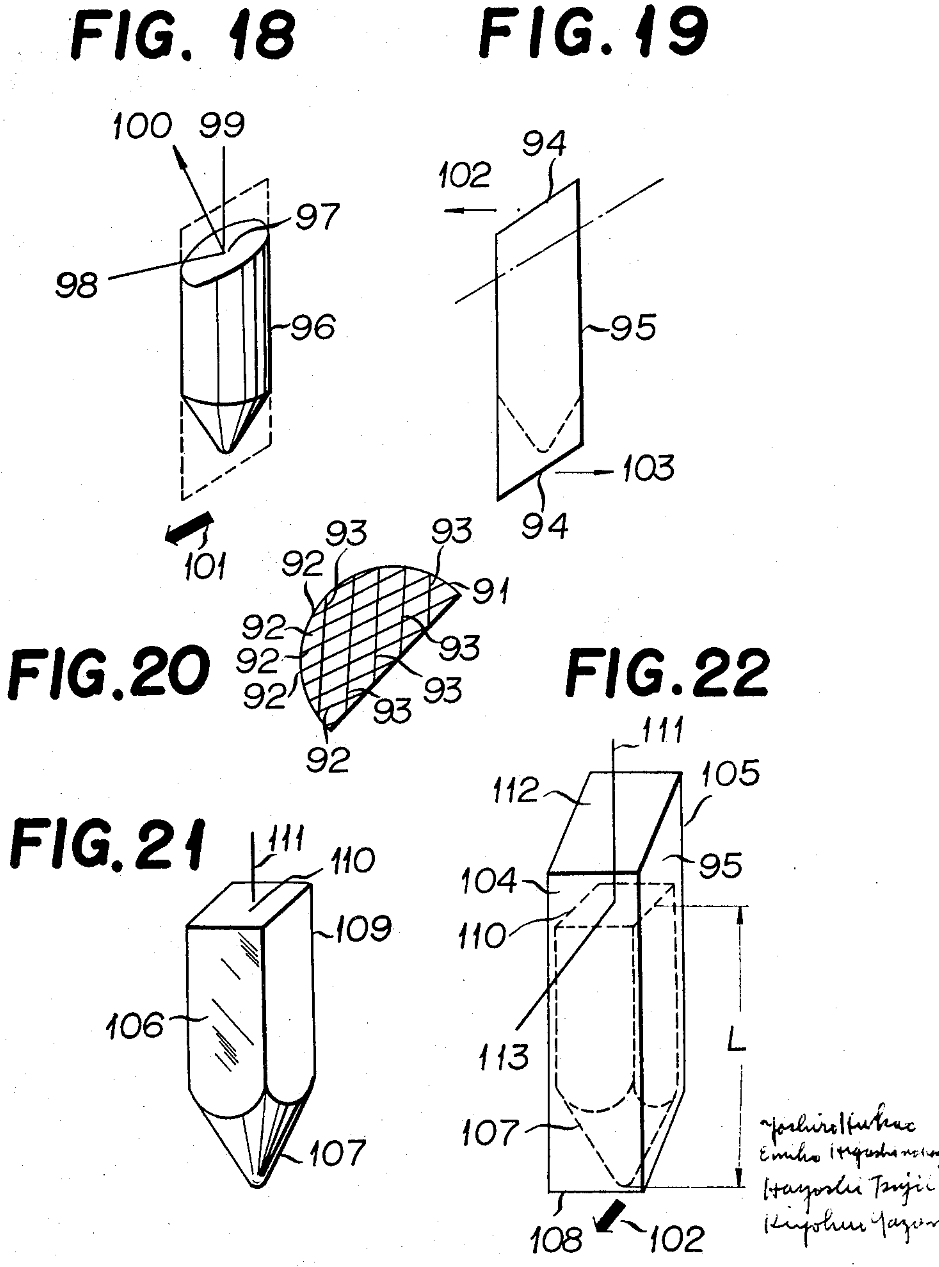
FIG. 18 is a perspective view of a modified record reproducing stylus tip prepared according to the method of this invention.
FIG. 19 is a side view of a rod shaped member from which the stylus tip shown in FIG. 18 is made.
FIG. 20 is a plan view to explain a method of cutting the rod shaped member shown in FIG. 19 from a raw material.
FIG. 21 is a perspective view of still another modification of the record reproducing stylus tip prepared by the method of this invention.
FIG. 22 is a perspective representation of a rod shaped member utilized to prepare the stylus tip shown in FIG. 21.

FIGS. 18 through 22 illustrate still further examples of the method of making sound reproducing stylus according to this invention. More particularly, as shown in FIG. 20, a thin sheet 91 of corundum crystal is positioned beforehand in a position which presents the desired crystalline orientation in which the amount of wear is small and the crystal is cut along a plurality of parallel lines 92. Then the sliced crystal is again cut along a plurality of parallel lines 93 to form rod shaped members 95 of parallelepipedons having inclined end surfaces 94 as shown in FIG. 19. One end of each of these rod shaped members 95 is machined to form a conical stylus tip 96 as shown in FIG. 18. The inclined end surface 97 still remains as the stylus tip 96. The crystal is cut so that the desirable orientation, indicated by an arrow 100 (FIG. 18) is contained in a plane containing a normal 98 to the inclined surface 97 as well as the axis 99 of the stylus. The stylus 96 thus produced is mounted on a stylus holder (not shown) so that the direction indicated by said arrow 100 coincides with the direction of rubbing 101 between the stylus tip and the sound track.

Since the crystal of corundum has a reverse symmetry the direction indicated by an arrow 103 at the lower end of the rod shaped member 95 shown in FIG. 19 is opposite to that shown by an arrow 102 on the upper end of the rod shaped member, so that when the desirable direction of rubbing where the lower end of the rod shaped member 95 is utilized as the stylus tip is denoted by the direction 103 then the desirable direction of rubbing where the upper end is utilized as the stylus tip would be denoted by the direction 102. Thus it is possible to always indicate the correct direction of rubbing irrespective to which one of the ends may be machined to form the stylus tip.

It is also possible to prepare a square rod shaped stylus as shown in FIG. 21 from the rod shaped member 95 shown in FIG. 19 by the step illustrated in FIG. 22. More particularly one side surface 104 or 105 of the rod shaped member 95, shown in FIG. 22, is mirror finished to form an indicating portion 106 (FIG. 21) prior to work the member to obtain a stylus tip. This indicating portion 106 indicates the direction of rubbing of the finished stylus, after the stylus tip has been formed. As shown in FIG. 22 then for the rod shaped member 95 to be made so as to have a length sufficient to provide an ample support for it when it is worked, it is necessary to remove the end 108 following the working of the tip 107 to provide a finished stylus tip having a given length $l$. The end surface 110 formed by said cutting operation of the end 108 should be perpendicular to the axis 111 of the stylus, thus eliminating the inclined surface 112 which was used as the reference for the direction of rubbing. The purpose of the indicating portion 106 formed by mirror finishing the side surface 104 or 105 prior to the working of the rod shaped member 95 shown in FIG. 22 into the stylus, is to retain said reference afforded by the inclined surface 112. Since this indicating portion 106, or a line 113 corresponding to the previous inclined surface 112 indicates the correct direction 102 of rubbing of the stylus tip 107 it is possible to correctly mount the stylus on the holder (not shown) by utilizing the indicating portion 106 as the reference.

As has been fully described, in accordance with this invention, having the crystal orientation in which the material has the greatest resistance to wear is determined it becomes possible to provide sound recording styluses of long useful life and uniform quality. Moreover, in accordance with this invention, since it is possible to predetermine the life of the product, worn out stylus can be replaced at the most reasonable time, so that damage to the record can be effectively precluded. Further the degree of wear of the spherical surface at points where the stylus tip contacts with the side walls of the sound groove of the phonograph record is made uniform so that it is possible to make the movement of the stylus with respect to the sound groove accurately thus improving the fidelity of sound reproduction over a long period of time. This is especially advantageous in the reproduction of the stereorecord because distortion of the reproduced sound is positively precluded. Moreover during working of the stylus it is possible to simply and readily mount the stylus tip to the stylus holder.

While the invention has been described with reference to particular embodiments thereof it should be understood that the invention is not limited thereto and that there may be made many modifications without departing from the spirit and scope of the invention as defined in the appended claims.

What is claimed is:

1. A method of preparing a stylyus for reproducing phonograph records comprising the steps of cutting a corundum ore to form a stylus tip having an axis of the crystalline orientation in regions whose angular coordinates ($\theta$, $\varphi$) are given by the following Table 2

TABLE 2

| $\theta°$ | $\varphi°$ | $\omega°$ | | |
|---|---|---|---|---|
| 7.5 -22.5 | −7.5-7.5 | 240-360 | 0- 30 | |
| 22.5 -37.5 | −7.5-7.5 | 210-300 | | |
| 37.5 -52.5 | −7.5-7.5 | 190-290 | | |
| 52.55-67.5 | −7.5-7.5 | 60-120 | | |
| 52.55-67.5 | 7.5-22.5 | 60-115 | | |
| 52.55-67.5 | 22.5-30 | 60-165 | 195-300 | |
| 67.5 -82.5 | −7.5-7.5 | 75-100 | | |
| 67.5 -82.5 | 22.5-30 | 270-305 | | |
| 82.5 -90 | 30- −22.5 | 0- 40 | 290-360 | |
| 82.5 -90 | −22.5- −7.5 | 330-360 | 0- 35 | 150-240 |
| 82.5 -90 | 7.5-22.5 | 330-360 | 0- 60 | 150-215 |
| 82.5 -90 | 22.5-30 | 140-220 | | |

and also in regions which are equivalent to said regions owing to the crystalline symmetry $\bar{3}m{-}D_{3d}$, and mounting the stylus tip thus formed on a stylus holder in such a way that the direction of rubbing $\omega$ between the stylus tip and the sound track of the record will be in the regions expressed in said table and the regions which are equivalent to said regions owing to said symmetry.

2. A method of preparing a stylus for reproducing phonograph records according to claim 1 comprising the steps of cutting a corundum ore to form a rod shaped member which satisfies the conditions described in said Table 2, forming a first indicating portion on the surface of said rod shaped member, said indicating portion serving as reference for the azimuth of a rotation about the axis of said rod shaped member, forming a second indicating portion on one end of the surface of said rod shaped member, forming a stylus tip having a spherical surface of a given curvature by utilizing said second indicating portion as a reference, while retaining said first indicating portion and mounting said stylus tip on a stylus holder by utilizing said first indicating portion as a reference so that said stylus is oriented to give a suitable crystalline orientation with respect to the direction of rubbing between the stylus and the record.

3. A method of preparing a stylus for reproducing a phonograph record according to claim 1 comprising the steps of cutting a corundum ore to form a rod shaped member having an inclined end surface, the longitudinal direction of said rod shaped member having a crystalline orientation that satisfies the conditions described in said Table 2, working one end of said rod shaped member to form a conical shape with a spherical stylus tip of a given curvature and mounting said stylus tip on a stylus holder such that said inclined end surface will assume a predetermined angle with respect to the direction of rubbing between said stylus and record.

4. A method of preparing a stylus for reproducing phonograph records according to claim 1, and further including the steps of forming an indicating portion on the surface of said corundum crystal which serves to determine a predetermined orientation with respect to the direction in which the amount of wear is small, shaping said crystal into a rod shaped member while retaining said indicating portion, shaping one end of said rod shaped member into a sphere of a given radius of curvature, while retaining said indicating portion, thus obtaining said stylus tip, said indicating portion of said stylus tip when mounted being oriented in a direction normal to the direction of rubbing.

5. A method of preparing styluses for reproducing phonograph records according to claim 1 and further including the steps of cutting said corundum crystal along a plurality of parallel lines forming a plurality of parallel slices, cutting said slices along a plurality of parallel lines to form a plurality of square rod shaped members, forming mirror finished surfaces on the side surfaces of said rod shaped members, forming said stylus tip with a spherical surface of given radius of curvature at one end of each of said rod shaped members, while retaining said mirror finished surface, thereby providing a reference for the azimuth about the axis of said tip and mounting each of said stylus tips on a stylus holder so that said azimuth will be the desirable crystalline orientation with respect to the direction of rubbing between said stylus and the record.

References Cited

UNITED STATES PATENTS

| | | | |
|---|---|---|---|
| 2,173,763 | 9/1939 | Olsen | 274—38 |
| 2,614,274 | 10/1952 | Moore | 29—417 X |
| 2,865,238 | 12/1958 | Retterath | 83—5 |
| 3,143,793 | 8/1964 | Griffitts et al. | 29—417 |
| 2,557,350 | 6/1951 | Hutter | 274—38 |
| 2,960,750 | 11/1960 | Bondley | 29—169.5 |

THOMAS H. EAGER, *Primary Examiner.*